(12) United States Patent
Rosen et al.

(10) Patent No.: US 8,978,150 B1
(45) Date of Patent: Mar. 10, 2015

(54) DATA RECOVERY SERVICE WITH AUTOMATED IDENTIFICATION AND RESPONSE TO COMPROMISED USER CREDENTIALS

(75) Inventors: Abraham Zeev Rosen, Even Yehuda (IL); Karl R. Ackerman, Topsfield, MA (US); Daniel T. Cohen, Even Yehuda (IL); Gali Kedar Ratson, Herzeliya (IL)

(73) Assignee: EMC Corporation, Hopkinton, MA (US)

( * ) Notice: Subject to any disclaimer, the term of this patent is extended or adjusted under 35 U.S.C. 154(b) by 195 days.

(21) Appl. No.: 13/534,694

(22) Filed: Jun. 27, 2012

(51) Int. Cl.
*G06F 7/04* (2006.01)
*H04L 29/06* (2006.01)
*G06F 21/50* (2013.01)

(52) U.S. Cl.
CPC ............ *H04L 63/1441* (2013.01); *H04L 63/20* (2013.01); *G06F 21/50* (2013.01)
USPC .............................................. 726/26; 726/28

(58) Field of Classification Search
None
See application file for complete search history.

(56) References Cited

U.S. PATENT DOCUMENTS

| | | | | |
|---|---|---|---|---|
| 5,898,783 | A * | 4/1999 | Rohrbach | 340/5.31 |
| 6,665,529 | B1 * | 12/2003 | Mills, Jr. | 455/411 |
| 7,392,423 | B2 * | 6/2008 | Henrickson | 714/4.11 |
| 7,571,483 | B1 * | 8/2009 | Bascle et al. | 726/24 |
| 8,005,737 | B2 * | 8/2011 | Hammad | 705/35 |
| 2007/0124807 | A1 * | 5/2007 | Jau | 726/6 |
| 2010/0241739 | A1 * | 9/2010 | Reus et al. | 709/222 |
| 2010/0325240 | A1 * | 12/2010 | Drako et al. | 709/217 |
| 2011/0165861 | A1 * | 7/2011 | Wilson et al. | 455/411 |
| 2013/0014236 | A1 * | 1/2013 | Bingell et al. | 726/6 |

OTHER PUBLICATIONS

Pathak, A.; Jafri, S.A.R.; Hu, Y.C., "The Case for Spam-Aware High Performance Mail Server Architecture," Distributed Computing Systems, 2009. ICDCS '09.29th IEEE International Conference on, vol., no., pp. 155,164, Jun. 22-26, 2009 doi: 10.1109/ICDCS.2009.74.*
Wikipedia contributors. "Warez." Wikipedia, The Free Encyclopedia. Wikipedia, The Free Encyclopedia, Jan. 23, 2012. Web. Sep. 18, 2013.*
"Rootkit." Wikipedia, The Free Encyclopedia. Wikimedia Foundation, Inc. May 31, 2012. Web. Apr. 20, 2013.*

* cited by examiner

*Primary Examiner* — Saleh Najjar
*Assistant Examiner* — Jason Plotkin
(74) *Attorney, Agent, or Firm* — BainwoodHuang

(57) ABSTRACT

A data recovery service protects against unauthorized use of a computer system. The service includes a data feed that contains data recovered from online repositories known to be used by malicious software or individuals, the recovered data identifying a compromised credential of an authorized user of the computer system. Based on this data, a protective action is automatically performed to limit or prevent use of the credential of the authorized user to access the computer system. Protective action may include disabling user account access privileges, etc.

20 Claims, 3 Drawing Sheets

DATA RECOVERY SERVICE WITH AUTOMATED IDENTIFICATION AND RESPONSE TO COMPROMISED USER CREDENTIALS

BACKGROUND

The present invention is related to the field of computer security.

One of the activities of concern in computer security is identity theft, specifically the theft or other unauthorized obtaining of credentials that enable users to access a protected computer system. Such credentials can include, among other things, account names and passwords, the latter normally required to be treated confidentially to prevent unauthorized use (i.e., use by somebody other than an authorized user to whom the password is assigned for use in accessing the system). An unauthorized person obtaining the credentials of an authorized user can pose as that authorized user and engage in activity that may harm the user, the operator of the system, or others. For example, if the computer system controls access to an organization's intellectual property (such as computer program source code, inventions, etc.), an unauthorized person may be able to access the system and manipulate and/or steal the intellectual property.

In some cases, credential theft is facilitated by certain types of software, referred to as "malware", that surreptitiously inhabits a user computer and monitors operation so as to obtain confidential information that is exposed during such operation. One well known example of such malware includes a so-called key logger, which by directly monitoring a user's keystrokes can thwart software mechanisms in the computer designed to protect a user's password or other confidential information. Other examples of malware functions include: document capturing, screen scraping (capturing the user's screen at a certain instant), network probing and more. Once the malware has collected this confidential information, it secretly exfiltrates it from the computer system to an Internet location, making it available to unauthorized persons who can use the information to obtain illegal access to the computer system protected by the password or similar user credential.

SUMMARY

Generally in the past, credential theft has been detected only after a stolen credential is used to access a user account in an unauthorized manner. In many cases, the fact that a user identity or credential has been compromised is not detected until such an unauthorized access occurs, creating a significant security risk.

Additionally, existing techniques for processing information pertaining to stolen credentials requires human users to review the information and initiate protective action, such as disabling a user account. This makes the process relatively slow as well as error-prone, thus limiting effectiveness.

A technique is disclosed that addresses credential theft, especially by malware but other means as well. The technique has a proactive characteristic that enables detection and protective action before a compromised credential can be used in an unauthorized way. In particular, the technique provides for automatic detection and initiation of protective action, and thus may be fast, accurate and flexibly deployed, in contrast to known techniques requiring human involvement. The technique also can leverage the capabilities of existing identity management systems such as Active Directory, Identity Guard®, etc., to effect a desired protective action in an automated way.

According to a disclosed method for protecting against unauthorized use of a computer system, a data recovery service is utilized that employs a data feed that contains data recovered from online repositories known to be used by malicious software or individuals, the recovered data identifying compromised user credentials of one or more authorized users of the computer system. Then a protective action is performed to limit or prevent use of a compromised credential to access the computer system. As mentioned, protective action may include things like disabling user account access privileges, etc.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
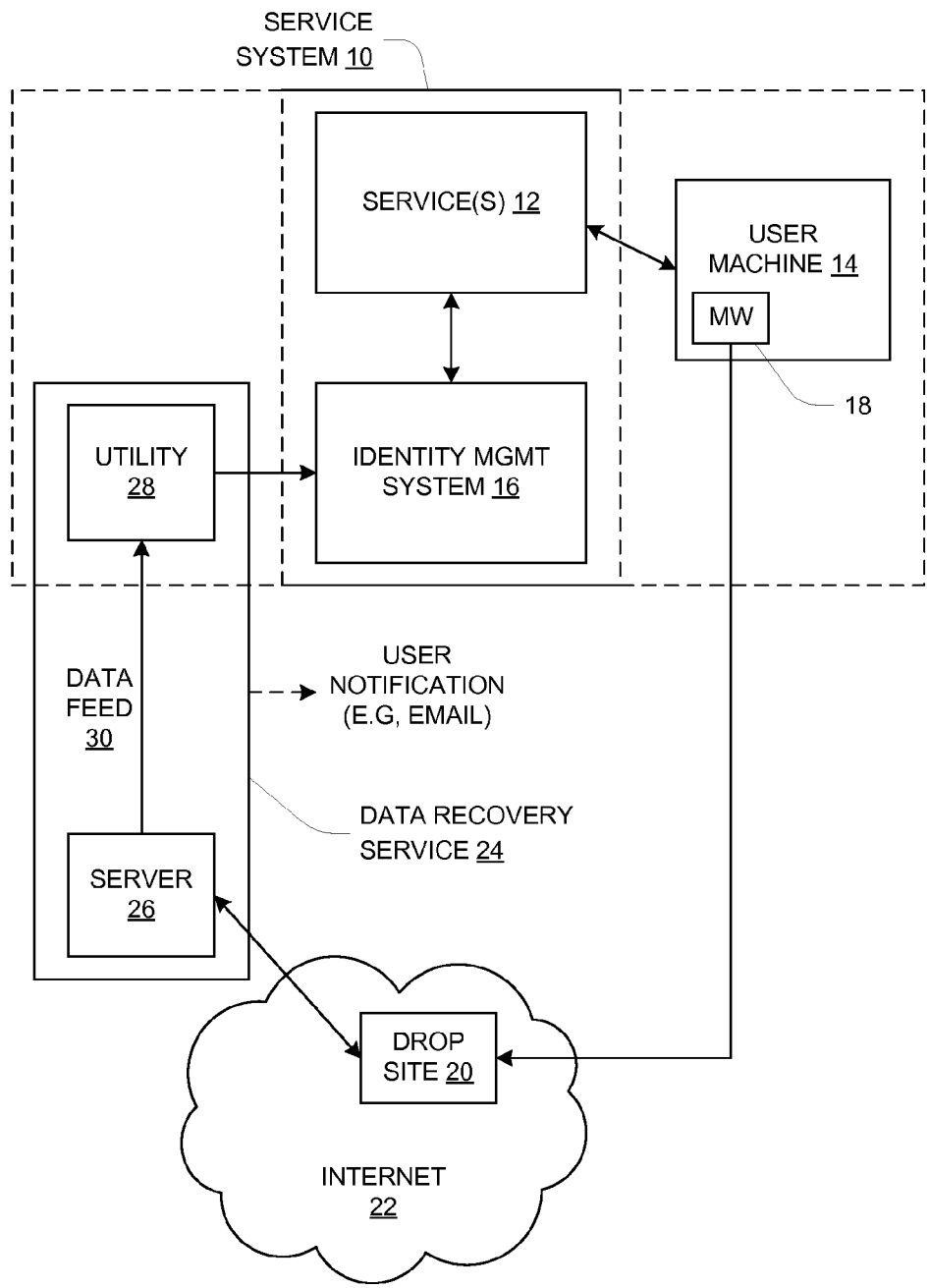
FIG. 1 is a block diagram showing a service system employing a data recovery service.

FIG. 1 shows an arrangement including a data processing system referred to as a "service system" 10 that provides data processing services 12 to users. A service 12 may take the form of an online data service or financial service, for example, or in a corporate intranet environment it may take the form of a specialized application such as a customer account database, a computer-aided design tool, etc. The service system 10 may be referred to herein as a "protected" computer system, meaning that it obtains the security benefit provided by the automated technique described herein.

The arrangement includes a user machine 14, such as a personal computer or other personal data processing device, of a user. As indicated by dashed lines, the user machine 14 may be part of or separate from the service system 10. A common example of the user machine 14 being part of a service system 10 is a corporate intranet, where the user machine 14 may be a workstation located in an employee's office and connected to the services 12 via one or more networks. Alternatively, the user machine 14 may be separate from the service system 10, such as in the case of an online service 12 provided at a publically accessible web site—in this case, the user machine 14 may be a smart phone or a personal computing device at a user's home, for example. In this description, the term "service" refers to the functionality of computer(s) executing computer program(s) to perform data processing tasks in response to user requests.

In one embodiment, the service system 10 employs an identity management system 16 as shown. The identity management system 16 is a sub-system specially tailored to provide functions of creating, protecting, and managing "identities" that are associated with users of the services 12. In one example, an online banking service may employ an identity management system 16 to enable a user to create user identification information such as user/account name and password, then to assist with authenticating users as a condition to allowing access to the services 12. Authentication may take the form, for example, of requiring a user to correctly enter the previously established identification information (user name and password) that is stored in the identity management system 16. In other embodiments, user identity management and authentication may be integrated into the service(s) 12 or provided in some other manner.

As described above, the user machine 14 may become inhabited or "infected" by malware (MW) 18 such as a Trojan or similar program capable of capturing confidential user information that can be used to breach security of the service system 10. The term "persistent threat" is also used herein to describe these kinds of programs. As an example, the malware 18 may capture a user name and password entered into the user machine 14 by a user when accessing a service 12. Typically such malware 18 also captures a variety of other information, such as a network name and address of the user machine 14 and perhaps of the service(s) 12, etc. In many cases, the malware 18 has a "logging" or similar function that forwards captured confidential information to a separate computer in a remote location, such as a so-called "drop site" 20 as shown. In one example, several separate instances of the malware 18 collect user names and passwords from a large number of infected user machines and forward this information to drop site 20. The intended use for this information may be to enable illicit/improper use of services 12 by cyber criminals. Such mechanisms and their use are generally known in the art of computer security. It is assumed for purposes of this description that the drop site 20 or other remote computer is part of the Internet 22 and accessible in at least a limited way from other computers, such as via a Web browser, file-transfer protocol, etc.

The operator of the service system 10 employs a data recovery service 24 as part of a security strategy. The data recovery service 24 includes a server 26 having communications channels to a local utility 28. The local utility 28 may be integrated into the service system 10, such as by installation as part of the identity management system 16 for example, or it may reside outside the service system 10 and have a defined communication interface thereto.

The data recovery service 24 is employed to detect the publication of confidential information of the service system 10 or its users (including user machines 14) so that protective action can be taken to prevent or otherwise address any potential security breach enabled by the publication of such confidential information. To this end, the data recovery service 24 employs security specialists (typically human, but may include automated mechanisms such as bots) that regularly scan accessible systems such as drop site 20 that are used by hackers, cyber criminals and their associated malware 18 to publicize confidential information obtained illegally. The security specialists locate such information at the drop site 20 and create reports or other organizations of such recovered data on server 26. This data populates a data feed 30 distributed to utilities 28 of the service 24. The data feed 30 includes reports identifying compromised user credentials (e.g., account names and passwords) discovered on the drop site 20.

Generally the data recovery service 24 is provided with information about the service system 10 and/or the user machines 14 to enable the data recovery service 24 to look for pertinent data at a drop site 20 and use the data to initiate protective and/or remedial action (also referred to as "mitigation"). For example, the data recovery service 24 receives a listing of the network addresses of all vulnerable computers in the service system 10, then compares network addresses occurring in the server 26 against this list so as to identify any data pertaining to such computers. Other information may include information describing user accounts and/or identities. This information is used to populate the data feed 30.

The utility 28 performs the following:
1. Pulling the data feed 30 from the server 26
2. Initiating mitigating action by notifying the identity management system 16

As shown in FIG. 1, the utility 28 may be set up inside the service system 10. The utility 28 goes out to the server 26 to obtain data (the data feed 30), then provides notifications internally within the service system 10 if mitigation is required. In a system having an identity management system 16 such as shown in FIG. 1, the utility 28 may use a specialized application programming interface (API) to the identity management system 16. This API may also include features enabling the utility 28 to request protective action by the identity management system 16 with respect to one or more user accounts or identities, usable as described below.

Figure 2:
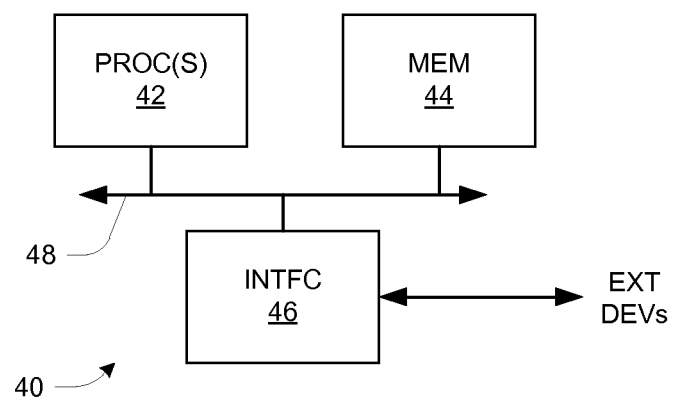
FIG. 2 is a block diagram of a hardware organization of a computer.

The services 12, identity management system 16 and utility 28 may be implemented by one or more computers executing corresponding sets of computer program instructions. In the case of an online service, for example, a collection of computers may be required to provide sufficient computing resources to meet an expected load from users. Partitioning of functions among different computers is generally known in the art. FIG. 2 shows an example hardware configuration of a computer 40 that may be employed. It includes one or more processors (PROC(S)) 42, memory (MEM) 44, and interface circuitry (INTFC) 46, all interconnected by data interconnections 48 such as one or more high-speed data buses. The interface circuitry 46 provides a hardware connection to external network(s) and perhaps other external devices/connections (EXT DEVs). The processor(s) 42 with connected memory 44 may also be referred to as "processing circuitry" herein. In operation, the memory 44 stores data and instructions of an operating system and one or more application programs which are executed by the processor(s) 42 to cause the computer to function in a corresponding manner. Thus the hardware executing the instructions of a service application program may be referred to as a "service component" or service 12, and the hardware executing instructions of a utility program may be referred to as a "utility component" or utility 28. It will be understood that a collection of such components can all be realized and interact with each other as one or more sets of computer processing hardware executing a collection of computer programs as generally known in the art.

Figure 3:
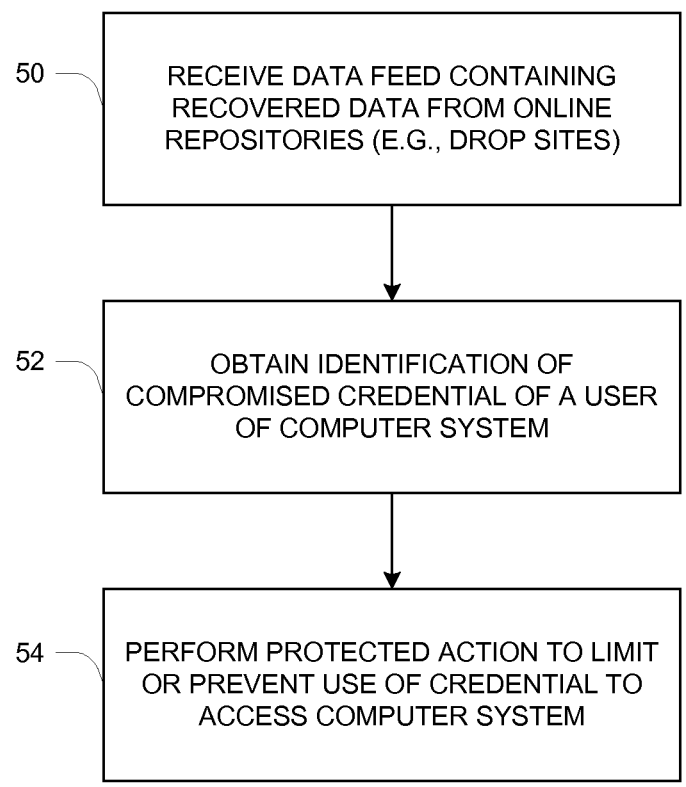
FIG. 3 is a flow diagram of operation of a data recovery utility forming part of the data recovery service.

FIG. 3 describes pertinent operation of the utility 28. At 50, it receives the data feed 30 which contains data recovered from online repositories (e.g., drop site 20) known to be used by malicious software or individuals, where the recovered data identifies compromised user credentials. At 52, the utility 28 obtains from the received data feed 30 a compromised credential of an authorized user of the service system 10. At 54, a protective action is performed to limit or prevent use of the compromised credential of the authorized user to access the service system 10.

There are a variety of protective actions that may be taken, some by the utility 28 itself and others in conjunction with an identity management system 16 (or more generally the service system 10).

To protect against unauthorized access to the services 12, some relatively strong form of automated action will normally be taken. For example, it may be desirable to automatically disable or suspend the access privileges of a user account whose credentials are found in the data feed 30. This disabling may be complete or partial, meaning that some limited form of access may still be granted for a limited time or for an emergency purpose. In the case of a corporate intranet where there is direct control over the user machine 14, it may be possible to automatically cause the machine 14 to be re-imaged, performing a fresh installation of the operating system and application programs and thereby purging the malware 18. This option may be especially useful when the user machine 14 is realized as a virtual machine in a data center. In one embodiment, the utility 28 merely provides notifications of compromised user credentials, and the identification and initiation of any specific protective action is left to the identity management system 16 and/or services 12. In other embodiments, the utility 28 may include a capability of requesting particular protective action via the API to the identity management system 16 and/or services 12, and does so when it identifies compromised user credentials of the service system 10 in the data feed 30.

One particular type of identity management system 16 is an authentication manager used as part of a multiple-factor authentication system employing physical devices or "tokens" carried by users and used to provide one-time passwords for logging in to a service 12. These devices require use of a personal identification number (PIN) or similar user-known value in order to be operated as part of the authentication service. If the user's PIN is compromised, it would be desirable to prevent further use of the token, and therefore one protective action would be to de-activate any token associated with that PIN within the authentication manager. Additionally, the system might automatically take steps to re-credential the user, such as by a process of changing the PIN securely, and/or issuing a new token with a system-selected PIN that is notified to the user securely.

While various embodiments of the invention have been particularly shown and described, it will be understood by those skilled in the art that various changes in form and details may be made without departing from the scope of the invention as defined by the appended claims.

What is claimed is:

1. An automated method of operating an identity management computer system for protecting against unauthorized use of a protected computer system, comprising:
   receiving, by the identity management computer system, via a first communication interface to a data security service computer, a data feed containing data recovered from publically accessible online repositories coupled to the protected computer system via a public network and known to be used by malicious software or individuals;
   analyzing, by the identify management computer system, the recovered data to identify compromised user credentials and/or identity information of one or more authorized users of the protected computer system; and
   performing, by the identify management computer system via a second communication interface to the protected computer system, a protective action to limit or prevent use of the recovered compromised user credential and/or identity information to access the protected computer system.

2. A method according to claim 1, wherein the identity management computer system is responsible for issuance and security of the user credentials, and wherein performing the protective action includes invoking a specific protective action via an external programming interface of the identity management computer system.

3. A method according to claim 1, wherein the protective action includes disabling system access privileges of the authorized user.

4. A method according to claim 3, wherein the system access privileges are disabled partially to allow limited system access for emergency purposes.

5. A method according to claim 3, wherein disabling system access privileges is accompanied by automatically re-credentialing the authorized user to enable the authorized user to access the protected computer system using newly issued user credentials.

6. A method according to claim 1, wherein the protected computer system hosts an online service accessible to the authorized user via a local network, and the protective action is limited to action within the protected computer system and does not directly affect a user machine of the authorized user.

7. A method according to claim 1, wherein the malware includes a persistent threat program persistently executing on a user machine of the authorized user, the persistent threat program (i) monitoring operation of the user machine to obtain the user credential and (ii) sending a stream of logging data including the user credential to one of the online repositories via the public network, and wherein the protective action is action specifically tailored to remove or incapacitate the persistent threat program.

8. A method according to claim 7, wherein the protective action includes automatically re-imaging the user machine with a fresh installation of an operating system and application programs free of the persistent threat program.

9. A computer, comprising:
   one or more processors;
   memory operative to store computer program instructions of a data recovery utility;
   interface circuitry providing an interface to external devices; and
   data interconnections interconnecting the processors, memory and interface circuitry,
   wherein the processors are operative to execute the computer program instructions of the data recovery utility to cause the computer to perform as an identity management system an automated method of protecting against unauthorized use of a protected computer system coupled to the computer, the automated method including:
   receiving, via a first communication interface to a data security service computer, a data feed containing data recovered from publically accessible online repositories coupled to the protected computer system via a public network and known to be used by malicious software or individuals;
   analyzing the recovered data to identify compromised user credentials and/or identity information of one or more authorized users of the protected computer system; and
   performing, via a second communication interface to the protected computer system, a protective action to limit or prevent use of the recovered compromised credential and/or identity information to access the protected computer system.

10. A computer according to claim 9, wherein the identify management system is responsible for issuance and security of the user credentials, and wherein performing the protective action includes invoking a specific protective action via an external programming interface of the identity management system.

11. A computer according to claim 9, wherein the protective action includes disabling system access privileges of the authorized user.

12. A computer according to claim 11, wherein the system access privileges are disabled partially to allow limited system access for emergency purposes.

13. A computer according to claim 11, wherein disabling system access privileges is accompanied by automatically re-credentialing the authorized user to enable the authorized user to access the protected computer system using newly issued user credentials.

14. A computer according to claim 9, wherein the protected computer system hosts an online service accessible to the authorized user via a local network, and the protective action is limited to action within the protected computer system and does not directly affect a user machine of the authorized user.

15. A computer according to claim 9, wherein the malware includes a persistent threat program persistently executing on a user machine of the authorized user, the persistent threat program (i) monitoring operation of the user machine to obtain the user credential and (ii) sending a stream of logging data including the user credential to one of the online repositories via the public network, and wherein the protective action is action specifically tailored to remove or incapacitate the persistent threat program.

16. A computer according to claim 15, wherein the protective action includes automatically re-imaging the user machine with a fresh installation of an operating system and application programs free of the persistent threat program.

17. A method according to claim 1, wherein the data feed includes a report prepared by a data security service operating the data security service computer, the report containing the recovered data identifying compromised user credentials and/or identity information obtained by the data security service from the online repositories.

18. A method according to claim 17, wherein the report is created by a security specialist of the data security service.

19. A method according to claim 17, wherein recovered data is identified as pertinent data by comparing data obtained from the online repositories with information about the protected computer system and/or user machines provided to the data security service.

20. A method according to claim 19, wherein the information about the protected computer system and/or user machines includes a listing of network addresses of all vulnerable computers in the protected computer system, and wherein comparing the data includes comparing the network addresses of the listing against network addresses found in the data obtained from the online repositories.

* * * * *